United States Patent
Motomura et al.

(10) Patent No.: US 10,195,556 B2
(45) Date of Patent: Feb. 5, 2019

(54) LAMINATED NONWOVEN FABRIC AND AIR PURIFIER

(71) Applicant: Panasonic Intellectual Property Management Co., Ltd., Osaka (JP)

(72) Inventors: Koji Motomura, Osaka (JP); Takahiko Murata, Osaka (JP); Hiroto Sumida, Nara (JP); Takatoshi Mitsushima, Nara (JP); Keiji Fujiwara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/191,522

(22) Filed: Jun. 23, 2016

(65) Prior Publication Data
US 2017/0028329 A1    Feb. 2, 2017

(30) Foreign Application Priority Data
Jul. 31, 2015    (JP) .................................. 2015-152717

(51) Int. Cl.
*B01D 39/00* (2006.01)
*B01D 39/16* (2006.01)
*D04H 3/02* (2006.01)

(52) U.S. Cl.
CPC ............. *B01D 39/163* (2013.01); *D04H 3/02* (2013.01); *B01D 2239/0618* (2013.01);
(Continued)

(58) Field of Classification Search
CPC .............. B01D 39/163; B01D 2239/83; B01D 2239/0618; B01D 2239/0681;
(Continued)

(56) References Cited

U.S. PATENT DOCUMENTS

2008/0026041 A1* 1/2008 Tepper ............... B01D 39/2017
424/445
2011/0067183 A1* 3/2011 Hawkins ............... A47C 27/144
5/740
(Continued)

FOREIGN PATENT DOCUMENTS

| JP | 2013-188734 | 9/2013 |
| JP | 2013-244452 | 12/2013 |
| WO | 2013/121733 | 8/2013 |

*Primary Examiner* — Frank M Lawrence, Jr.
(74) *Attorney, Agent, or Firm* — Pearne & Gordon LLP (57) ABSTRACT

A laminated nonwoven fabric includes a first nonwoven fabric containing first fibers, a second nonwoven fabric containing second fibers, a third nonwoven fabric containing third fibers, and an adhesive. The second nonwoven fabric is laminated on the first nonwoven fabric, and the third nonwoven fabric is laminated on the second nonwoven fabric on an opposite side with respect to the first nonwoven fabric. The adhesive is disposed between the first nonwoven fabric and the third nonwoven fabric. An average fiber diameter of the second fibers is equal to or less than 3 μm, and is smaller than an average fiber diameter of the first fibers. The third nonwoven fabric has a protrusion including a part of the third fibers entangled with each other on a surface facing the second nonwoven fabric. At least a part of the adhesive is disposed between the protrusion and the first nonwoven fabric.

10 Claims, 3 Drawing Sheets

(52) U.S. Cl.
CPC ........... *B01D 2239/0681* (2013.01); *B01D 2239/083* (2013.01); *B01D 2239/1233* (2013.01); *B01D 2275/10* (2013.01)

(58) Field of Classification Search
CPC ...... B01D 2239/083; B01D 2239/1233; B01D 2275/10; D04H 3/02
USPC .................................. 55/482, 485, 486, 527
See application file for complete search history.

(56) References Cited

U.S. PATENT DOCUMENTS

| | | | |
|---|---|---|---|
| 2013/0180180 A1* | 7/2013 | Yener | C09K 3/1436 51/309 |
| 2014/0224727 A1* | 8/2014 | Yu | B01D 71/10 210/491 |
| 2014/0231337 A1* | 8/2014 | Fujii | F02M 37/22 210/483 |

* cited by examiner

LAMINATED NONWOVEN FABRIC AND AIR PURIFIER

BACKGROUND

1. Technical Field

The present disclosure relates to, for example, a laminated nonwoven fabric used as a filter medium of an air purifier, and an air purifier including the laminated nonwoven fabric.

2. Description of the Related Art

As a filter medium using a certain type of laminated nonwoven fabric, the filter medium used in an air purifier or the like, has been proposed (for example, International Publication No. WO2013/121733). Such a laminated nonwoven fabric includes a first nonwoven fabric which functions as a base, a second nonwoven fabric, and a third nonwoven fabric. The second nonwoven fabric contains a fiber having an average fiber diameter smaller than that of a fiber of the first nonwoven fabric, and has a dust collection function. The third nonwoven fabric protects the second nonwoven fabric and has a dust collection function.

SUMMARY

A first laminated nonwoven fabric of the present disclosure includes a first nonwoven fabric, a second nonwoven fabric, a third nonwoven fabric, and an adhesive. The first nonwoven fabric contains first fibers. The second nonwoven fabric is laminated on the first nonwoven fabric and contains second fibers. The third nonwoven fabric is laminated on the second nonwoven fabric on an opposite side with respect to the first nonwoven fabric and contains third fibers. The adhesive is disposed between the first nonwoven fabric and the third nonwoven fabric. An average fiber diameter of the second fibers is equal to or less than 3 µm, and an average fiber diameter of the first fibers is larger than the average fiber diameter of the second fibers. The third nonwoven fabric has a protrusion on a surface facing the second nonwoven fabric. The protrusion includes a part of the third fibers entangled with each other. At least a part of the adhesive is disposed between the protrusion and the first nonwoven fabric.

A second laminated nonwoven fabric of the present disclosure includes a first nonwoven fabric, a second nonwoven fabric, and an adhesive. The first nonwoven fabric contains first fibers and second fibers. The second nonwoven fabric is laminated on the first nonwoven fabric and contains third fibers. The adhesive is disposed between the first nonwoven fabric and the second nonwoven fabric. The average fiber diameter of the second fibers is equal to or less than 3 µm, and an average fiber diameter of the first fibers is larger than the average fiber diameter of the second fibers. The first nonwoven fabric includes a base layer including a part of the first fibers, and a composite layer disposed closer to the second nonwoven fabric than the base layer is, and including another part of the first fibers and the second fibers. The second nonwoven fabric has a protrusion on a surface facing the first nonwoven fabric. The protrusion includes a part of the third fibers entangled with each other. At least a part of the adhesive is disposed between the protrusion and the first nonwoven fabric.

An air purifier of the present disclosure includes a sucker of a gas; a discharger of the gas; and a laminated nonwoven fabric disposed between the sucker and the discharger. The laminated nonwoven fabric is one of the first laminated nonwoven fabric and the second laminated nonwoven fabric.

According to the present disclosure, it is possible to suppress peeling between the nonwoven fabrics in the laminated nonwoven fabric.

DETAILED DESCRIPTION OF PREFERRED EMBODIMENTS

Prior to description of embodiments of the present disclosure, a problem of a laminated nonwoven fabric of the related art will be described briefly. When the laminated nonwoven fabric disclosed in International Publication No. WO2013/121733 is formed in a pleat shape, the second nonwoven fabric and the third nonwoven fabric may be peeled off from the first nonwoven fabric. If the second nonwoven fabric and the third nonwoven fabric are peeled off, dust collection efficiency is considerably reduced in a case where the laminated nonwoven fabric is used as a filter medium.

Embodiment 1

Figure 1A:
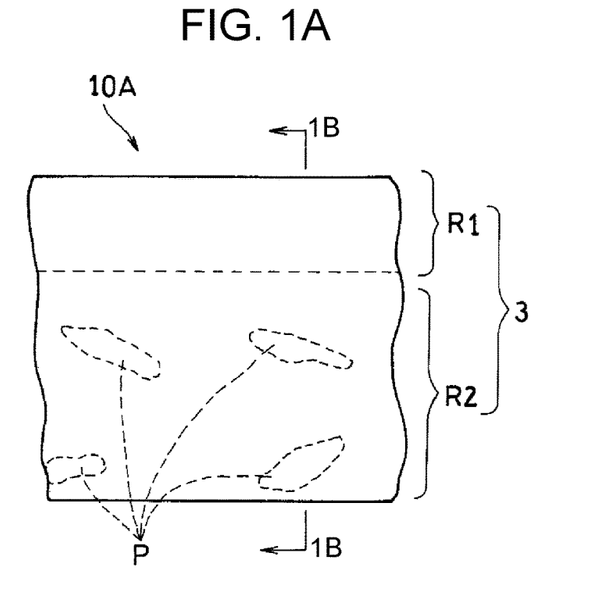
FIG. 1A is a top view schematically illustrating main portions of a laminated nonwoven fabric according to an embodiment of the present disclosure.
Figure 1B:
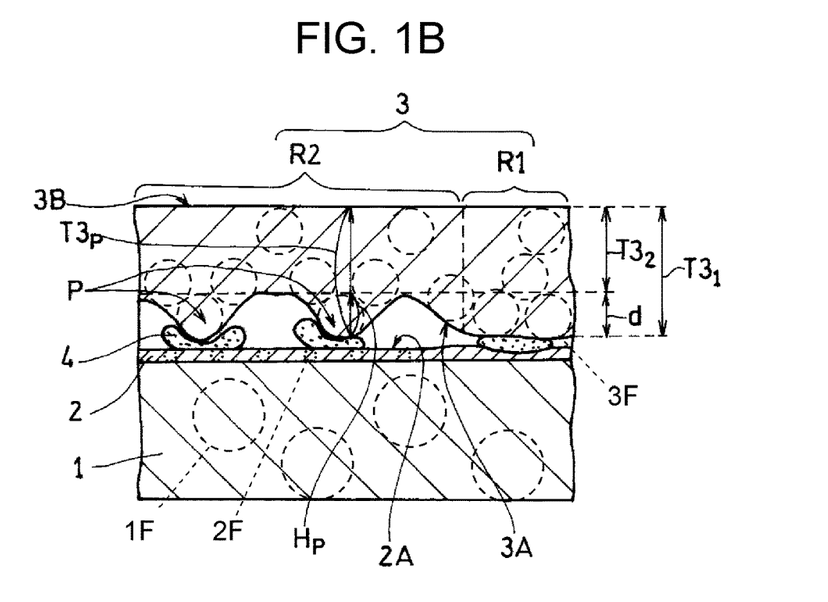
FIG. 1B is a sectional view schematically illustrating the main portions of the laminated nonwoven fabric illustrated in FIG. 1A.

Laminated nonwoven fabric 10A according to Embodiment 1 of the present disclosure will be described with reference to FIGS. 1A and 1B. FIG. 1A is a top view schematically illustrating main portions of laminated nonwoven fabric 10A, and FIG. 1B is a sectional view taken along the line 1B-1B in FIG. 1A.

Laminated nonwoven fabric 10A includes first nonwoven fabric 1, second nonwoven fabric 2, third nonwoven fabric 3, and adhesive 4. First nonwoven fabric 1 contains first fibers 1F, and second nonwoven fabric 2 is laminated on first nonwoven fabric 1 and contains second fibers 2F. Third nonwoven fabric 3 is laminated on principal surface 2A of second nonwoven fabric 2 not facing first nonwoven fabric 1, and contains third fibers 3F. In other words, third nonwoven fabric 3 is laminated on second nonwoven fabric 2 on an opposite side with respect to first nonwoven fabric 1. Adhesive 4 is disposed between first nonwoven fabric 1 and third nonwoven fabric 3. The nonwoven fabric containing the fibers indicates that the fibers are contained as main components. In this case, the content of the main components is 80% by weight or greater. Hereinafter, laminated nonwoven fabric 10A will be described in detail as a form appropriate for a filter medium of an air purifier, but an application of laminated nonwoven fabric 10A is not limited thereto.

First nonwoven fabric 1 functions as a base for holding the shape of laminated nonwoven fabric 10A. In a case of subjecting laminated nonwoven fabric 10A to pleating, first nonwoven fabric 1 works as a base, thereby holding the shape of a pleat.

First nonwoven fabric 1 contains first fibers 1F. Materials of first fibers 1F are not particularly limited, and may include, for example, glass fibers, cellulose, acrylic resin, polypropylene (PP), polyethylene (PE), polyester (for example, polyethylene terephthalate (PET) and polybutylene terephthalate), polyamide (PA), or mixtures thereof. Above all, as materials of first fibers 1F, PET or cellulose is preferably used from the viewpoint of holding the shape. Average fiber diameter D1 of first fibers 1F is not particularly limited, and is, for example, 1 μm to 40 μm, and is preferably 5 μm to 20 μm.

Average fiber diameter D1 is an average value of diameters of first fibers 1F. The diameter of first fiber 1F is a diameter of a section perpendicular to a length direction of first fiber 1F. In a case where such a section is not circular, a maximum diameter may be considered as the diameter. A width in a direction perpendicular to the length direction of first fiber 1F when viewed from the normal direction of one principal surface of first nonwoven fabric 1 may be regarded as the diameter of first fiber 1F. Average fiber diameter D1 is an average value of diameters of, for example, any ten first fibers 1F contained in first nonwoven fabric 1 at any locations. This is also the same for average fiber diameters D2 and D3 which will be described later.

First nonwoven fabric 1 is manufactured by using, for example, a spun bonding method, a dry method (for example, an air-laid method), a wet method, a melt blow method, a needle punch method, or the like, and a manufacturing method thereof is not particularly limited. Above all, first nonwoven fabric 1 is preferably manufactured by using the wet method in that it is easy to form a nonwoven fabric appropriate for a base.

A pressure loss of first nonwoven fabric 1 is also not particularly limited. Above all, in a case of performing measurement with a measuring machine in conformity with the regulations of JIS B9908, Form 1, an initial pressure loss of first nonwoven fabric 1 is preferably about 1 Pa to 10 Pa. As long as the initial pressure loss of first nonwoven fabric 1 falls within this range, an initial pressure loss of the whole of laminated nonwoven fabric 10A is also reduced. In the test method in the above-mentioned Form 1, a pressure loss is measured as follows. A filter unit having laminated nonwoven fabric 10A is held in a unit fixer without leakage of air. A static pressure measurer is attached to the filter unit. The static pressure measurer includes straight tubes sandwiching the filter unit therebetween, and the straight tubes are provided with static pressure measurement holes, respectively, perpendicular to tube walls on an upstream side and a downstream side. In this state, a blower sends wind to the filter unit in a rated air volume. The static pressure on the upstream side and that on the downstream side are measured by manometers which are connected to the static pressure measurement holes via the tubes, respectively, and thus the pressure loss is obtained.

Thickness T1 of first nonwoven fabric 1 is preferably 50 μm to 500 μm, and is more preferably 150 μm to 400 μm, from the viewpoint of pressure loss. The thickness of the nonwoven fabric is, for example, an average value of thicknesses of any ten locations in the nonwoven fabric (the same applies hereinafter). The thickness is a distance between two principal surfaces of the nonwoven fabric. Specifically, an image of a section of the nonwoven fabric is captured, and, when a line perpendicular to one surface is drawn from any one point on one principal surface of the nonwoven fabric to the other principal surface, among fibers on the line, a distance between outsides of two fibers which are most distant from each other is obtained as the thickness of the nonwoven fabric. This is similarly performed on a plurality of any other points (for example, nine points) so that thicknesses of the nonwoven fabric are calculated, and a numerical value obtained by averaging the thicknesses is used as the thickness of the nonwoven fabric. When the thickness of the nonwoven fabric is calculated, an image having undergone a binarization process may be used.

Mass per unit area of first nonwoven fabric 1 is preferably 10 $g/m^2$ to 80 $g/m^2$, and is more preferably 35 $g/m^2$ to 60 $g/m^2$, from the viewpoint of pressure loss.

Second nonwoven fabric 2 contains second fibers 2F having average fiber diameter D2 smaller than average fiber diameter D1 of first fibers 1F, and has a function of capturing dust. Average fiber diameter D2 is preferably 1/10 or less of average fiber diameter D1, and is more preferably 1/100 of average fiber diameter D1. In other words, $D2 \leq D1/10$ is preferably satisfied, and $D2 \leq D1/100$ is more preferably satisfied. Average fiber diameter D2 is preferably 1/1000 or more of average fiber diameter D1. As long as average fiber diameter D2 falls within this range, a pressure loss is reduced and dust collection efficiency also tends to increase. Specifically, average fiber diameter D2 is equal to or less than 3 μm. Average fiber diameter D2 is preferably equal to or less than 1 μm, and is more preferably equal to or less than 300 nm. Average fiber diameter D2 is preferably equal to or more than 30 nm, and is more preferably equal to or more than 50 nm.

Mass per unit area of second nonwoven fabric 2 is preferably 0.01 $g/m^2$ to 1.5 $g/m^2$, more preferably 0.01 $g/m^2$ to 0.5 $g/m^2$, and most preferably 0.03 $g/m^2$ to 0.1 $g/m^2$. As long as second nonwoven fabric 2 satisfies the condition, a pressure loss is reduced and high dust collection efficiency also tends to be achieved.

Materials of second fibers 2F are not particularly limited, and may include, for example, polymers such as PA, polyimide (PI), polyamideimide (PAI), polyetherimide (PEI), polyacetal (POM), polycarbonate (PC), polyether ether ketone (PEEK), polysulfone (PSF), polyethersulfone (PES), polyphenylene sulfide (PPS), polytetrafluoroethylene (PTFE), polyarylate (PAR), polyacrylonitrile (PAN), polyvinylidene fluoride (PVDF), polyvinyl alcohol (PVA), polyvinyl acetate (PVAc), PP, PET, and polyurethane (PU). These materials may be used alone or in combination of two or more kinds thereof. Above all, in a case where second fibers 2F are formed by using an electrostatic spinning method, PES is preferably used. PVDF is preferably used in that average fiber diameter D2 is easily reduced.

Thickness T2 of second nonwoven fabric 2 is preferably 0.5 μm to 10 μm, and is more preferably 1 μm to 5 μm, from the viewpoint of pressure loss. In a case where measurement is performed in the same condition as described above, an initial pressure loss of second nonwoven fabric 2 is preferably about 5 Pa to 40 Pa. At least some of second fibers 2F may be put into gaps among first fibers 1F forming first nonwoven fabric 1. In this case, second nonwoven fabric 2 includes a composite layer formed of first fibers 1F and second fibers 2F. In this case, thickness T2 indicates the thickness of the second nonwoven fabric including the composite layer. This configuration will be described in detail in Embodiment 2.

Third nonwoven fabric 3 has a function of collecting relatively large dust, and functions as a protection material for protecting second nonwoven fabric 2 from various external loads. Third nonwoven fabric 3 preferably has undergone a charging process from the viewpoint of dust collection efficiency.

Third nonwoven fabric 3 contains third fibers 3F. Materials of third fibers 3F are not particularly limited, and may exemplify the same materials as those of first nonwoven fabric 1. Above all, PP is preferably used in that the material is easily charged. Average fiber diameter D3 of third fibers 3F is not particularly limited. Average fiber diameter D3 is, for example, 0.5 µm to 20 µm, and is preferably 5 µm to 20 µm.

Third nonwoven fabric 3 has protrusions P on principal surface 3A facing second nonwoven fabric 2. Each of protrusions P includes a part of third fibers 3F interlaced with each other. Shapes of protrusions P or a method of forming protrusions P will be described later. A manufacturing method of third nonwoven fabric 3 is not particularly limited, and the methods exemplified in first nonwoven fabric 1 may be exemplified in the same manner. Above all, third nonwoven fabric 3 is preferably manufactured by using the melt blow method from the viewpoint that it is easy to form a nonwoven fabric having a small fiber diameter appropriate for a filter medium. Protrusions P may be formed on principal surface 3A of third nonwoven fabric 3 manufactured by using, for example, the melt blow method, by performing post-processing which will be described later.

A pressure loss of third nonwoven fabric 3 is not particularly limited. Above all, in a case where measurement is performed in the same condition as described above, an initial pressure loss of third nonwoven fabric 3 is preferably about 10 Pa to 50 Pa. As long as the initial pressure loss of third nonwoven fabric 3 falls within this range, a pressure loss of the whole of laminated nonwoven fabric 10A is also reduced.

Second nonwoven fabric 2 and third nonwoven fabric 3 are adhered to each other via adhesive 4. For example, a granular thermosetting resin is sprayed as adhesive 4 onto a surface to which second nonwoven fabric 2 in the laminate of first nonwoven fabric 1 and second nonwoven fabric 2 is exposed, and is melted by using a heating device. Next, third nonwoven fabric 3 is laminated on the surface of the laminate on which adhesive 4 is sprayed, and is then pressed.

At this time, if adhesion between the laminate and third nonwoven fabric 3 is not sufficient, third nonwoven fabric 3 may be peeled off. When third nonwoven fabric 3 is peeled off, second nonwoven fabric 2 is also peeled off from first nonwoven fabric 1. This is because first nonwoven fabric 1 and second nonwoven fabric 2 are laminated without using adhesive 4. Second nonwoven fabric 2 is formed on first nonwoven fabric 1 by using, for example, an electrostatic spinning method. In the electrostatic spinning method, second fibers 2F are formed by applying a high voltage to a raw material liquid in which a resin (raw material resin) as a raw material of second fibers 2F forming second nonwoven fabric 2 is dissolved into a solvent, and by ejecting a raw material liquid having electric charge from a nozzle. Second fibers 2F are accumulated on first nonwoven fabric 1 in a state of including the solvent, so as to form second nonwoven fabric 2. At this time, second fibers 2F including the solvent are tightly adhered to first fibers 1F forming first nonwoven fabric 1, and thus both of the fibers are bonded to each other. In other words, first nonwoven fabric 1 and second nonwoven fabric 2 are adhered to each other through point adhesion between the fibers, and thus first nonwoven fabric 1 and second nonwoven fabric 2 are easily peeled off from each other. If second nonwoven fabric 2 and third nonwoven fabric 3 are peeled off from each other, in a case where laminated nonwoven fabric 10A is used as a filter medium, dust collection efficiency is considerably reduced.

If the laminate and third nonwoven fabric 3 are pressed by applying a large load thereto in order to suppress peeling of third nonwoven fabric 3, a pressure loss of obtained laminated nonwoven fabric 10A considerably increases. This may be because second fibers 2F having a small average fiber diameter are deformed due to the pressure, and thus voids of second nonwoven fabric 2 are reduced.

Therefore, in the present disclosure, peeling of third nonwoven fabric 3 is suppressed by disposing protrusions P including a part of third fibers 3F interlaced with each other on principal surface 3A of third nonwoven fabric 3 facing second nonwoven fabric 2.

In other words, laminated nonwoven fabric 10A according to the present disclosure includes first nonwoven fabric 1 containing first fibers 1F, second nonwoven fabric 2 containing second fibers 2F, third nonwoven fabric 3 containing third fibers 3F, and adhesive 4. Second nonwoven fabric 2 is laminated on first nonwoven fabric 1, and third nonwoven fabric 3 is laminated on principal surface 2A of second nonwoven fabric 2 not facing first nonwoven fabric 1. Adhesive 4 is disposed between first nonwoven fabric 1 and third nonwoven fabric 3. Average fiber diameter D1 of first fibers 1F and average fiber diameter D2 of second fibers 2F satisfy a relationship of D1>D2. Third nonwoven fabric 3 has protrusions P including a part of third fibers 3F interlaced with each other on principal surface 3A facing second nonwoven fabric 2. At least a part of adhesive 4 is disposed between each of protrusions P and first nonwoven fabric 1. Consequently, peeling of third nonwoven fabric 3 and further second nonwoven fabric 2 is suppressed without increasing a pressure loss.

Third nonwoven fabric 3 has protrusions P on principal surface 3A facing second nonwoven fabric 2. Protrusion P is an aggregate of third fibers 3F, formed as a result of a part of third fibers 3F forming third nonwoven fabric 3 being interlaced with each other. Protrusion P is the same as a so-called pill in terms of quality. A shape of protrusion P is not particularly limited. For example, a shape of protrusion P viewed from a normal direction of principal surface 3A may be a circular shape, may be a linear shape, and may be an undefined shape as illustrated in FIG. 1A.

Protrusions P are pressed against first nonwoven fabric 1 earlier than other portions of third nonwoven fabric 3 in a pressing step. Thus, a large load is not applied to second fibers 2F facing portions other than protrusions P, and thus deformation thereof is suppressed. Adhesive 4 is interposed between protrusions P which are pressed earlier and first nonwoven fabric 1. Consequently, third nonwoven fabric 3 and first nonwoven fabric 1 can be reliably adhered to each other. In other words, since protrusions P are disposed in third nonwoven fabric 3, third nonwoven fabric 3 and second nonwoven fabric 2 can be suppressed from being peeled off without increasing a pressure loss. Adhesive 4 may be in contact with second nonwoven fabric 2 as illustrated in FIG. 1A, and may be in direct contact with first nonwoven fabric 1. Adhesive 4 may be disposed between a portion of third nonwoven fabric 3 in which protrusions P are not disposed and first nonwoven fabric 1.

Protrusions P may be disposed on the entire principal surface 3A, but are preferably disposed in at least a portion of second fibers 2F which is easily deformed from the viewpoint of suppressing a pressure loss. For example, in a melting step of adhesive 4, a portion (central portion) of the laminate facing the center of a heating device is likely to be considerably heated due to characteristics of the heating device. Thus, second fibers 2F located at the central portion which has been sufficiently heated are more easily deformed than other portions in the subsequently performed pressing step. Therefore, there is a tendency that a pressure loss increases, especially, in the central portion. This tendency becomes notable along with an increase of the number of production lots. In this case, protrusions P are preferably disposed in a portion of third nonwoven fabric 3 corresponding to the central portion. For example, in a case where third nonwoven fabric 3 is long, protrusions P are preferably disposed in a strip-shaped region (central region) which is formed in a longitudinal direction of third nonwoven fabric 3, has the same center as the center of third nonwoven fabric 3 in a transverse axis, and occupies 50% to 75% of an area of third nonwoven fabric 3.

A thickness of third nonwoven fabric 3 in which protrusions P are disposed is preferably smaller than a thickness of a portion in which protrusions P are not disposed. In other words, as illustrated in FIG. 1B, third nonwoven fabric 3 has a region (second region R2) which is relatively thin region and a thick region (first region R1), and protrusions P are preferably disposed in second region R2. Consequently, in second region R2, protrusions P and first nonwoven fabric 1 are reliably adhered to each other, and second fibers 2F are also prevented from being deformed. Also in first region R1, it becomes easier to ensure adhesion between third nonwoven fabric 3 and first nonwoven fabric 1. Thus, the adhesion strength due to adhesive 4 is further improved. First region R1 may include protrusions P, but heights thereof may be preferably smaller than heights of protrusions P disposed in second region R2. This is because an effect achieved by disposing protrusions P in second region R2 is reduced.

In a case where third nonwoven fabric 3 is long, preferably, a thickness of the central region in which second fibers 2F are easily deformed is relatively thin, and protrusions P are disposed in the central region. In other words, the central region of third nonwoven fabric 3 is set as second region R2, and a region other than the central region is set as first region R1. Consequently, an increase in the pressure loss is further suppressed.

First region R1, second region R2, and protrusions P can be clearly differentiated from each other by observing principal surface 3A or a section of third nonwoven fabric 3. Protrusion P is formed as a result of third fibers 3F extracted from a part of the principle surface of third nonwoven fabric 3 being entangled with each other, and thus has an aspect (for example, the density or tissues of third fibers 3F) different from each region. Protrusion P may also be identified by transmitting light through laminated nonwoven fabric 10A. A shadow of protrusion P appears to be darker than those of other portions.

Whether or not a region of third nonwoven fabric 3 in which protrusions P are disposed is relatively thin second region R2 may be determined as follows. For example, a part (for example, 12 cm×12 cm) of the region (arrangement region) in which protrusions P are disposed and a part of the other region (non-arrangement region) are cut out of third nonwoven fabric 3. In the cut arrangement region, protrusion P is specified according to the above-described method, and thicknesses of any ten locations in the other portion are measured, and an average value thereof is calculated. Similarly, also in the non-arrangement region, thicknesses of any ten locations are measured, and an average value thereof is calculated. In a case where the thickness average value of the arrangement region is smaller than the thickness average value of the non-arrangement region, and difference d between the obtained average values is 20% or more of the thickness average value of the non-arrangement region, it is determined that protrusions P are formed in second region R2. On the other hand, in a case where difference d is less than 20% of the thickness average value of the non-arrangement region, third nonwoven fabric 3 is regarded as having a substantially uniform thickness.

The ratio ($T3_2/T3_1$) of average thickness $T3_2$ of second region R2 to average thickness $T3_1$ of first region R1, calculated in the above-described way, is not particularly limited, and may be, for example, 0.60 to 0.98, and may be 0.70 to 0.95. From the viewpoint of pressure loss, thickness $T3_1$ is preferably 100 µm to 500 µm, and is more preferably 150 µm to 400 µm. Thickness $T3_2$ is preferably 100 µm to 400 µm, and is more preferably 150 µm to 300 µm.

Height Hp of protrusion P is preferably larger than difference d (refer to FIG. 1B). Height Hp may be calculated as a difference between distance $T3_P$ from principal surface 3B opposite to principal surface 3A to the top of protrusion P and thickness $T3_2$ of second region R2. The ratio (Hp/d) of height Hp to difference d is preferably 1 to 100, and is more preferably 10 to 50. Distance $T3_P$ may also be calculated by averaging thicknesses of any ten locations in the portion having protrusions P in the same manner as thickness $T3_1$ or the like. Specifically, height Hp is preferably 50 µm to 2000 µm, and is more preferably 100 µm to 1000 µm.

Mass per unit area of first region R1 and second region R2 is not particularly limited. Above all, from the viewpoint of pressure loss, mass per unit area of first region R1 is preferably 15 g/m$^2$ to 50 g/m$^2$, and is more preferably 15 g/m$^2$ to 30 g/m$^2$. Mass per unit area of second region R2 is preferably 10 g/m$^2$ to 25 g/m$^2$, and is more preferably 10 g/m$^2$ to 20 g/m$^2$.

In a case where the thickness of third nonwoven fabric 3 is uniform, thickness T3 thereof is preferably 100 µm to 500 µm, and is more preferably 150 µm to 400 µm, from the viewpoint of pressure loss. In this case, from the viewpoint of pressure loss, mass per unit area of third nonwoven fabric 3 is preferably 10 g/m$^2$ to 50 g/m$^2$, and is more preferably 10 g/m$^2$ to 30 g/m$^2$.

A mass ratio (in other words, a mass ratio of the third fibers forming protrusion P) of protrusion P is preferably 1% by mass to 20% by mass, inclusive, of the region including protrusion P, and is more preferably 1% by mass to 10% by mass, inclusive, thereof, from the viewpoint of peeling strength. Consequently, adhesive 4 is easily disposed between protrusion P and first nonwoven fabric 1. The region including protrusions P may be the entire surface of third nonwoven fabric 3, and may be second region R2 or the central region. A mass ratio of protrusions P may be calculated as follows, for example. First, a part (for example, 12 cm×12 cm) of the region including protrusions P is cut out of third nonwoven fabric 3. In a case where protrusions P are formed on the entire surface of third nonwoven fabric 3, a cut region is not limited. Mass of the cut portion is measured, and further all of protrusions P are cut. Mass of cut protrusions P is measured, and the mass ratio may be calculated by dividing the mass of cut protrusions P by the previously measured mass of the cut portion.

An area ratio of protrusions P is not particularly limited. Above all, from the same viewpoint, the area ratio thereof is preferably 1% to 40% of the region including protrusions P, and is more preferably 5% to 20%. The area ratio of protrusions P may be calculated, for example, by capturing an image of a part of the region including protrusions P from a normal direction thereof, processing the captured image, and specifying a portion occupied by protrusions P.

A method of forming protrusions P is not particularly limited. One principal surface 3A of third nonwoven fabric 3 is rubbed with a roller or a spatula made of rubber, so that third fibers 3F are fluffed up, and thus third fibers 3F are entangled with each other, thereby forming protrusions P.

Laminated nonwoven fabric 10A may be manufactured according to a manufacturing method including a first preparation step, a second preparation step, a third preparation step, a nonwoven fabric forming step, an adhesive spraying step, a heating step, and a laminate step. In the first preparation step, first nonwoven fabric 1 containing first fibers 1F is prepared. In the second preparation step, a raw material liquid containing a raw material resin as a raw material of second fibers 2F and a solvent dissolving the raw material resin is prepared. In the third preparation step, third nonwoven fabric 3 containing third fibers 3F is prepared. In the nonwoven fabric forming step, the raw material liquid is sprayed onto first nonwoven fabric 1 so that second fibers 2F are generated from the raw material liquid, and second fibers 2F are accumulated on one principal surface of first nonwoven fabric 1. In the adhesive spraying step, particles of adhesive 4 are sprayed onto the principal surface of first nonwoven fabric 1 on which second fibers 2F are accumulated. In the heating step, adhesive 4 sprayed on the principal surface is melted. In the laminate step, third nonwoven fabric 3 is laminated on first nonwoven fabric 1 with melted adhesive 4 via second fibers 2F.

Figure 2:
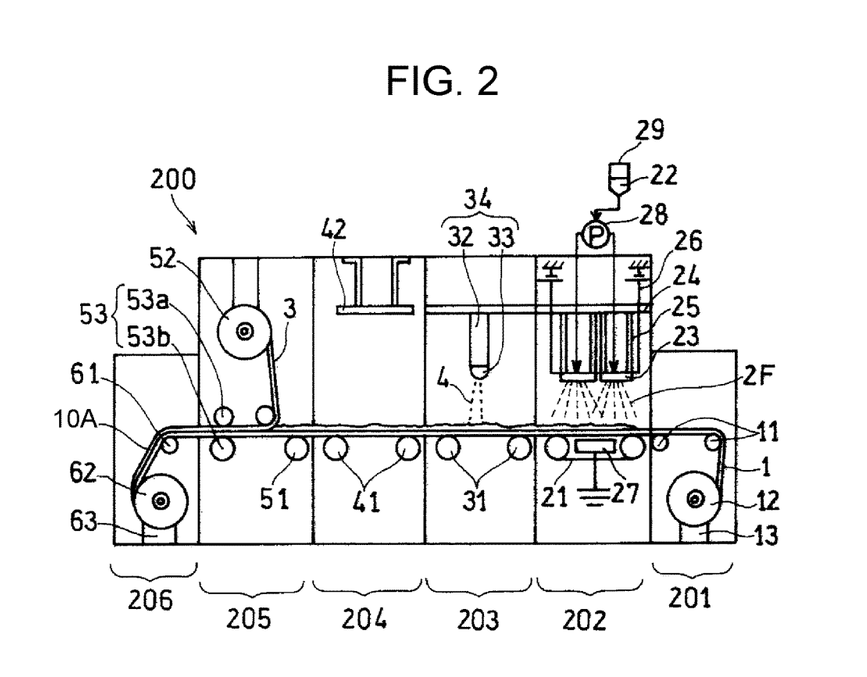
FIG. 2 is a diagram illustrating a configuration example of a manufacturing system used to manufacture the laminated nonwoven fabric according to the embodiment of the present disclosure.

Hereinafter, with reference to FIG. 2, a description will be made of a manufacturing method of laminated nonwoven fabric 10A and manufacturing system 200 performing the method, but the following system and manufacturing method do not limit the present disclosure. FIG. 2 is a diagram schematically illustrating an example of a configuration of manufacturing system 200 of laminated nonwoven fabric 10A. Manufacturing system 200 includes a manufacturing line for manufacturing laminated nonwoven fabric 10A.

The manufacturing method of laminated nonwoven fabric 10A may be performed by, for example, manufacturing system 200 which conveys first nonwoven fabric 1 from an upstream side to a downstream side of the line, forms second nonwoven fabric 2 on the principal surface of conveyed first nonwoven fabric 1, and then laminates third nonwoven fabric 3 thereon. Manufacturing system 200 includes, for example, first nonwoven fabric feeding device (hereinafter, referred to as feeding device) 201, electrostatic spinning unit 202 as a forming device of the second nonwoven fabric, adhesive spraying device (hereinafter, referred to as spraying device) 203, heating device 204, and third nonwoven fabric laminate device (hereinafter, referred to as laminate device) 205. Feeding device 201 feeds first nonwoven fabric 1 to a conveyance belt (conveyance conveyer 21). Electrostatic spinning unit 202 includes an electrostatic spinning mechanism which generates second fibers 2F from raw material liquid 22 by using an electrostatic force. Spraying device 203 sprays adhesive 4 from an upper side of second nonwoven fabric 2 sent from electrostatic spinning unit 202. Heating device 204 melts sprayed adhesive 4. Laminate device 205 laminates third nonwoven fabric 3 on second nonwoven fabric 2 sent from heating device 204.

Hereinafter, the manufacturing method using manufacturing system 200 will be described. First, first nonwoven fabric 1 is prepared. In manufacturing system 200, first nonwoven fabric 1 is conveyed from the upstream side to the downstream side thereof by conveyance rolls 11, 31, 41 and 51, and conveyance conveyer 21. Feeding device 201 which accommodates therein first nonwoven fabric 1 wound in a roll form is provided on the most upstream side of manufacturing system 200. Feeding device 201 rotates first feed reel 12 with motor 13 so as to feed first nonwoven fabric 1 wound on first feed reel 12 to conveyance roll 11.

First nonwoven fabric 1 is conveyed to electrostatic spinning unit 202 by conveyance roll 11. The electrostatic spinning mechanism provided in electrostatic spinning unit 202 includes discharger 23, a charger (which will be described later), and conveyance conveyer 21. Discharger 23 discharges a raw material liquid of second fibers 2F provided on an upper side in the apparatus. The charger positively charges the discharged raw material liquid. Conveyance conveyer 21 conveys first nonwoven fabric 1 which is disposed to face discharger 23, from the upstream side to the downstream side. Conveyance conveyer 21 functions as a collector which collects second fibers 2F along with first nonwoven fabric 1. The number of electrostatic spinning units 202 is not particularly limited, and may be one, or two or more electrostatic spinning units may be serially provided.

In a case where there are a plurality of electrostatic spinning units 202, or in a case where a plurality of dischargers 23 are provided in single electrostatic spinning unit 202, an average fiber diameter of second fibers 2F to be formed may be changed for each electrostatic spinning unit 202 or for each discharger 23. The average fiber diameter of second fibers 2F may be changed by adjusting ejection pressure of a raw material liquid which will be described later, an applied voltage, concentration of the raw material liquid, a distance from discharger 23 to first nonwoven fabric 1, temperature, humidity, and the like. An amount of accumulated second fibers 2F is controlled by adjusting ejection pressure of a raw material liquid, an applied voltage, concentration of the raw material liquid, a conveyance speed of first nonwoven fabric 1, and the like.

A plurality of discharge outlets (not illustrated) of raw material liquid 22 are provided in discharger 23 so as to face the principal surface of first nonwoven fabric 1. Although a distance between the discharge outlet of discharger 23 and first nonwoven fabric 1 varies depending on a scale of manufacturing system 200 or a desired fiber diameter, the distance may be, for example, 100 mm to 600 mm. Discharger 23 is supported by second support 25 in such a manner that its own longitudinal direction is parallel to the principal surface of first nonwoven fabric 1. Second support 25 is provided above electrostatic spinning unit 202, and extends downwardly from first support 24 parallel to the conveyance direction of first nonwoven fabric 1. First support 24 may be movable so that discharger 23 is swung in a direction perpendicular to the conveyance direction of first nonwoven fabric 1.

The charger is formed of voltage applying device 26 applying a voltage to discharger 23, and counter electrode 27 provided to be parallel to conveyance conveyer 21. Counter electrode 27 is grounded (connected to the ground). Consequently, a potential difference (for example, 20 kV to 200 kV) corresponding to the voltage applied by voltage applying device 26 can be caused between discharger 23 and counter electrode 27. The configuration of the charger is not particularly limited. For example, counter electrode 27 may be negatively charged. The belt portion of conveyance conveyer 21 may be formed of a conductor instead of providing counter electrode 27.

Discharger 23 is formed of a conductor and has a long shape, and its interior is a cavity. The cavity functions as an accommodator accommodating raw material liquid 22 therein. Raw material liquid 22 is supplied from raw material liquid tank 29 to the cavity of discharger 23 by a pressure produced by pump 28 communicating with the cavity of discharger 23. Raw material liquid 22 is discharged from the discharge outlet toward the principal surface of first nonwoven fabric 1 by the pressure produced by pump 28. Discharged raw material liquid 22 causes electrostatic explosion to produce a fibrous material (second fibers 2F) during movement in a charged state in a space (generation space) between discharger 23 and first nonwoven fabric 1.

A solvent contained in raw material liquid 22 may be appropriately selected depending on the kind of raw material resin or a manufacturing condition. Examples of the solvent which can be used include methanol, ethanol, 1-propanol, 2-propanol, hexafluoroisopropanol, tetraethylene glycol, triethylene glycol, dibenzyl alcohol, 1,3-dioxolane, 1,4-dioxane, methyl ethyl ketone, methyl isobutyl ketone, methyl n-hexyl ketone, methyl n-propyl ketone, diisopropyl ketone, diisobutyl ketone, acetone, hexafluoroacetone, phenol, formic acid, methyl formate, ethyl formate, propyl formate, methyl benzoate, ethyl benzoate, propyl benzoate, methyl acetate, ethyl acetate, propyl acetate, &methyl phthalate, diethyl phthalate, dipropyl phthalate, methyl chloride, ethyl chloride, methylene chloride, chloroform, o-chlorotoluene, p-chlorotoluene, carbon tetrachloride, 1,1-dichloroethane, 1,2-dichloroethane, trichloroethane, dichloropropane, dibromoethane, dibromopropane, methyl bromide, ethyl bromide, propyl bromide, acetic acid, benzene, toluene, hexane, cyclohexane, cyclohexanone, cyclopentane, o-xylene, p-xylene, m-xylene, acetonitrile, tetrahydrofuran, N,N-dimethylformamide, N,N-dimethylacetamide (DMAc), dimethyl sulfoxide, pyridine, and water. These may be used alone or in combination of plural kinds thereof. Above all, as will be described later, in a case where second fibers 2F containing polyether sulfone (PES) are formed according to an electrostatic spinning method, DMAc is preferred in that the material is appropriate for the electrostatic spinning method, and PES is easily dissolved.

An inorganic solid material may be added to raw material liquid 22. Examples of the inorganic solid material may include oxides, carbides, nitrides, borides, silicides, fluorides, and sulfides. Above all, the oxides are preferably used from the viewpoint of workability or the like. Examples of the oxides may include $Al_2O_3$, $SiO_2$, $TiO_2$, $Li_2O$, $Na_2O$, MgO, CaO, SrO, BaO, $B_2O_3$, $P_2O_5$, $SnO_2$, $ZrO_2$, $K_2O$, $Cs_2O$, ZnO, $Sb_2O_3$, $As_2O_3$, $CeO_2$, $V_2O_5$, $Cr_2O_3$, MnO, $Fe_2O_3$, CoO, NiO, $Y_2O_3$, $Lu_2O_3$, $Yb_2O_3$, $HfO_2$, and $Nb_2O_5$. These may be used alone or in combination of plural kinds thereof.

A mixing ratio of the solvent and the raw material resin in raw material liquid 22 differs depending on the kind of selected solvent and the kind of raw material resin. A proportion of the solvent in raw material liquid 22 is, for example, 60% by mass to 95% by mass.

A configuration of the electrostatic spinning mechanism forming second fibers 2F is not limited to the above-described configuration. As long as a mechanism can generate second fibers 2F from a raw material liquid by an electrostatic force in a predetermined generation space of second fibers 2F, and can accumulate generated second fibers 2F on the principal surface of first nonwoven fabric 1, the mechanism can be used without being particularly limited. For example, a shape of a section perpendicular to the length direction of discharger 23 may be a shape (V-shaped nozzle) which is gradually reduced from the top to the bottom.

After second nonwoven fabric 2 is formed, a laminate of first nonwoven fabric 1 and second nonwoven fabric 2 is conveyed to spraying device 203. In spraying device 203, adhesive 4 is sprayed from the upper side of second nonwoven fabric 2. Adhesive 4 is sprayed according to, for example, a spray method or a free fall method. An amount of sprayed adhesive 4 is not particularly limited, and is preferably 0.5 $g/m^2$ to 15 $g/m^2$, more preferably 1 $g/m^2$ to 10 $g/m^2$, most preferably 3 $g/m^2$ to 9 $g/m^2$, from the viewpoint of adhesiveness.

Adhesive 4 is preferably sprayed in a solid state in that adhesive 4 is easily disposed between protrusion P and first nonwoven fabric 1. The solid state is a state in which a predetermined shape is held, and is, for example, a granular state. Average particle diameter D50 of powdery adhesive 4 is not particularly limited, and is, for example, 150 μm to 350 μm, and preferably 180 μm to 300 μm. Average particle diameter D50 is a median diameter in a volume particle size distribution obtained by a laser diffraction type particle size distribution measurer (this also applies hereinafter).

The kind of adhesive 4 is not particularly limited, and may be, for example, a hot melt adhesive having a thermosetting resin as a main component. Examples of the thermosetting resin may include PU, polyester such as PET, copolyester such as urethane modified copolymer polyester, PA, and polyolefin (for example, PP or PE). A melting point of adhesive 4 is preferably about 60° C. to 140° C.

Spraying device 203 is provided with sprayer 34, and sprayer 34 includes, for example, adhesive tank 32 which is provided above and accommodates adhesive 4, and spraying member 33 spraying adhesive 4.

After adhesive 4 is sprayed and before third nonwoven fabric 3 is laminated on the laminate, adhesive 4 is melted by heating device 204 provided with heating mechanism 42. The solvent included in second nonwoven fabric 2 is removed in heating device 204.

Heating mechanism 42 is not particularly limited, and may employ a well-known heating mechanism as appropriate. The heating temperature may be set as appropriate depending on a boiling point of the solvent and a melting point of adhesive 4. The heating temperature is adjusted so that the temperature of the surface of the laminate is preferably 100° C. to 200° C., and is more preferably 120° C. to 170° C.

Next, the laminate is conveyed to laminate device 205, and, in the laminate device 205, third nonwoven fabric 3 including protrusions P is supplied from the upper side of the laminate and is laminated on the laminate via adhesive 4. In a case where third nonwoven fabric 3 is long, third nonwoven fabric 3 may be wound on second feed reel 52 in the same manner as first nonwoven fabric 1. In this case, third nonwoven fabric 3 is unwound from second feed reel 52 and is laminated on the laminate.

After third nonwoven fabric 3 is laminated, laminated nonwoven fabric 10A may be pressed while applying pressure thereto with a pair of pressing rolls 53 (pressing rolls 53a and 53b) which are vertically disposed with laminated nonwoven fabric 10A interposed therebetween, and thus the laminate and third nonwoven fabric 3 may be tightly adhered to each other.

Finally, laminated nonwoven fabric 10A is conveyed from laminate device 205, and is then conveyed to collecting device 206 which is disposed on the further downstream side, via roll 61. For example, collecting device 206 has therein collecting reel 62 for winding conveyed laminated nonwoven fabric 10A thereon. Collecting reel 62 is driven by motor 63.

Embodiment 2

Figure 3:
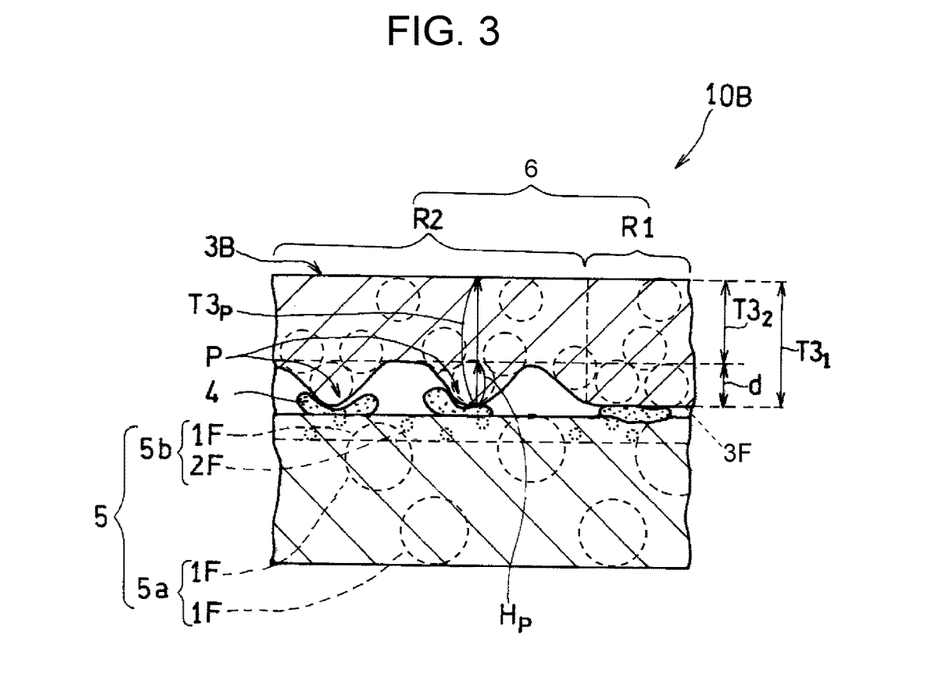
FIG. 3 is a sectional view schematically illustrating main portions of another laminated nonwoven fabric according to the embodiment of the present disclosure.

Laminated nonwoven fabric 10B according to the present embodiment includes first nonwoven fabric 5 and second nonwoven fabric 6 instead of first nonwoven fabric 1, second nonwoven fabric 2, and third nonwoven fabric 3, as illustrated in FIG. 3. Second nonwoven fabric 6 corresponds to third nonwoven fabric 3 in Embodiment 1. First nonwoven fabric 5 includes base layer 5a having first fibers 1F as main components, and composite layer 5b having first fibers 1F and second fibers 2F as main components. Remaining configurations are the same as those in Embodiment 1. In this case, second nonwoven fabric 6 has protrusions P on a principal surface facing first nonwoven fabric 5. Each of protrusions P includes a part of third fibers 3F entangled with each other. And at least a part of adhesive 4 is disposed between each of protrusions P and first nonwoven fabric 5. Base layer 5a corresponds to first nonwoven fabric 1 in Embodiment 1, and has a function of holding a shape of laminated nonwoven fabric 10B. For example, in a case of subjecting laminated nonwoven fabric 10B to pleating, the shape of a pleat is held by base layer 5a. Composite layer 5b corresponds to second nonwoven fabric 2 in Embodiment 1, and achieves a dust collection effect.

Such first nonwoven fabric 5 may be obtained by accumulating second fibers 2F on a base having first fibers 1F as main components by using, for example, an electrostatic spinning method, in the same manner as in the method of obtaining the laminate of first nonwoven fabric 1 and second nonwoven fabric 2. In this case, for example, an amount of accumulated second fibers 2F is reduced. Consequently, most (for example, 90% by mass or more) of second fibers 2F accumulated on the base are embedded in gaps among first fibers 1F, and thus composite layer 5b is formed. Thus, first fibers 1F and second fibers 2F are prevented from being separated from each other. Second fibers 2F of composite layer 5b do not form a self-supported layer. Therefore, even if some of second fibers 2F are separated from first fibers 1F, a situation in which other second fibers 2F are successively separated hardly occurs. Therefore, peeling of second nonwoven fabric 6 is further suppressed.

A thickness of first nonwoven fabric 5 (total of base layer 5a and composite layer 5b) is preferably 50 μm to 500 μm, and is more preferably 150 μm to 400 μm, from the viewpoint of pressure loss.

From the viewpoint of dust collection efficiency, second fibers 2F are preferably disposed in a region ranging over 2 μm from one principal surface of first nonwoven fabric 5 in the thickness direction of first nonwoven fabric 5, and are more preferably disposed in a region ranging over 1 μm from one principal surface of first nonwoven fabric 5. In other words, the thickness of composite layer 5b is preferably 0.1 μm to 2 μm, and is more preferably 0.5 μm to 1 μm.

Air Purifier

Figure 4:
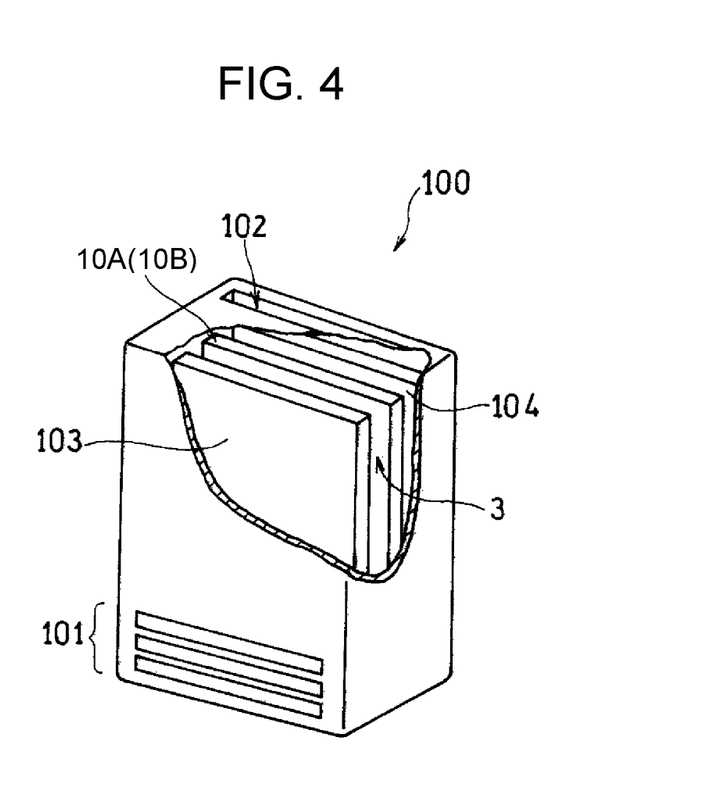
FIG. 4 is a partially cut perspective view schematically illustrating an air purifier according to the embodiment of the present disclosure.

As exemplified in FIG. 4, air purifier 100 according to the present disclosure includes sucker 101 of a gas, discharger 102 of the gas, and laminated nonwoven fabric 10A disposed therebetween. Laminated nonwoven fabric 10A may be subjected to pleating in a pleated state and arranged. Laminated nonwoven fabric 10A is a filter medium capturing dust in the air. In air purifier 100, a pressure loss is minimized for a long period of time. From the viewpoint of dust collection efficiency, laminated nonwoven fabric 10A is preferably disposed between sucker 101 and discharger 102 so that third nonwoven fabric 3 faces sucker 101. Laminated nonwoven fabric 10B may be used instead of laminated nonwoven fabric 10A. In this case, laminated nonwoven fabric 10B is preferably disposed between sucker 101 and discharger 102 so that second nonwoven fabric 6 faces sucker 101.

Air purifier 100 takes the external air from sucker 101 into the inside of air purifier 100. The taken air is subjected to dust collection during a time when the air passes through laminated nonwoven fabric 10A or 10B and the like, and the cleaned air is again discharged from discharger 102 into the outside. Air purifier 100 may further include pre-filter 103 for capturing a large dust or the like between sucker 101 and laminated nonwoven fabric 10A or 10B. Air purifier 100 may include deodorizing filter 104 or a humidifying filter (not illustrated) between laminated nonwoven fabric 10A or 10B and discharger 102.

EXAMPLES

Hereinafter, Examples of the present disclosure will be described in detail, but the present disclosure is not limited to such Examples.

Example 1

A base composed mainly of cellulose (thickness T1: 300 μm, D1: 15 μm, and mass per unit volume: 42 g/m$^2$) is used as the first nonwoven fabric. By using the manufacturing system illustrated in FIG. 2, the second fibers are accumulated on the conveyed first nonwoven fabric so as to form the second nonwoven fabric, and thus the laminate is manufactured. As a raw material liquid of the second fibers, a DMAc solution containing 20% by mass of PES is used. Average fiber diameter D2 is 273 nm.

Next, a granular adhesive (polyester-based hot melt resin, melting point: about 100° C.) is sprayed onto the second nonwoven fabric of the laminate according to a free fall method. An amount of the sprayed adhesive is 5.7 g/m$^2$, and an average particle diameter is 215 μm. The surface of the laminate is heated to 158° C., and then the third nonwoven fabric is laminated on the second nonwoven fabric. Next, the laminated nonwoven fabric is manufactured through pressing using pressing rolls. A pressure in the pressing is 5 kPa.

A long melt blow nonwoven fabric composed mainly of PP fibers (D3: 5 μm) is used as the third nonwoven fabric, and a strip-shaped central region thereof is rubbed by using a roll made of rubber so that protrusions P are formed. Consequently, a thickness of the central region is thinner than other portions. Thickness $T3_2$ of the central region (second region R2) is 178 μm, and mass per unit area thereof is 19 g/m$^2$. Thickness $T3_1$ of the other region (first region R1) is 212 μm, and mass per unit area thereof is 21 g/m$^2$. With respect to protrusions P, height Hp is 446 μm, the ratio to second region R2 is 3% by mass, and an area ratio to second region R2 is 8%. When a section of the laminated nonwoven fabric is observed, it is confirmed that the adhesive is disposed between protrusion P and the first nonwoven fabric.

Comparative Example 1

A melt blow nonwoven fabric (D3: 5 μm, and T3: 187 μm) is used as the third nonwoven fabric, the nonwoven fabric not having undergone a rubbing process using the roll made of rubber. Other processes are the same as in Example 1, and thus the laminated nonwoven fabric is manufactured. The third nonwoven fabric has a uniform thickness, and thus does not include protrusions P.

Comparative Example 2

A melt blow nonwoven fabric (D3: 5 μm) is used as the third nonwoven fabric, the nonwoven fabric being rubbed by using the roll made of rubber so that protrusions P are formed, and only protrusions P being cut out thereof. Other processes are the same as in Example 1, and thus the laminated nonwoven fabric is manufactured. The third nonwoven fabric has first region R1 and second region R2, but does not include protrusions P.

Evaluation

Results obtained by evaluating Example 1, Comparative Examples 1 and 2 manufactured in the above-described way are shown in Table 1.

(1) Peeling Strength

The peeling strength between the first nonwoven fabric and the third nonwoven fabric is measured according to a method conforming to JIS Z0237 (corresponding to ISO 29862 2007). As a sample, a laminated nonwoven fabric (width 20 mm×length 200 mm) which is cut to include first reion R1 and second region R2 of the third nonwoven fabric is used. The sample used for evaluation is cut out of a laminated nonwoven fabric which is manufactured at the time when one or more hours have elapsed from starting of manufacturing thereof.

(2) Pressure Loss

A laminated nonwoven fabric of 12 cm×12 cm is separately cut to include first region R1 and second region R2 of the third nonwoven fabric, and thus a sample is manufactured, and a sucking test is performed at a surface wind speed of 5.3 cm/sec. Air pressure P0 on the upstream side of the sample and air pressure P1 on the downstream side thereof are measured, and thus a pressure loss (=P0−P1) is calculated. A measurer (manometer) conforming to the standards of JISB9908 is used to measure the air pressure.

TABLE 1

|  | Peeling Strength (mN/10 mm) | Pressure Loss (Pa) |
| --- | --- | --- |
| Example 1 | 71 | 35 |
| Comparative Example 1 | 52 | 55 |
| Comparative Example 2 | 33 | 36 |

As is clear from the results shown in Table 1, the laminated nonwoven fabric of Example 1 has greater peeling strength than those of the laminated nonwoven fabrics of Comparative Examples 1 and 2, and has a pressure loss equivalent to that of the laminated nonwoven fabric of Comparative Example 2.

As mentioned above, the laminated nonwoven fabric of the present disclosure suppresses peeling of the nonwoven fabric formed of fibers with a small average fiber diameter. Thus, the laminated nonwoven fabric of the present disclosure is appropriate for a filter medium of an air purifier or an air conditioner, a separation sheet for a battery, a membrane for a fuel cell, an extracorporeal inspection sheet such as a pregnancy test sheet, a medical sheet for cell culture, a dustproof cloth such as a dustproof mask or a dustproof wear, a cosmetic sheet, a wiping sheet for wiping dust, and the like.

What is claimed is:

1. A laminated nonwoven fabric comprising:
a first nonwoven fabric containing first fibers;
a second nonwoven fabric laminated on the first nonwoven fabric and containing second fibers;
a third nonwoven fabric laminated on the second nonwoven fabric on an opposite side with respect to the first nonwoven fabric and containing third fibers; and
an adhesive disposed between the first nonwoven fabric and the third nonwoven fabric,
wherein an average fiber diameter of the second fibers is equal to or less than 3 μm,
an average fiber diameter of the first fibers is equal to or larger than ten times of the average fiber diameter of the second fibers,
the third nonwoven fabric has a protrusion on a surface facing the second nonwoven fabric, the protrusion including a part of the third fibers entangled with each other,
at least a part of the adhesive is disposed between the protrusion and the first nonwoven fabric,
the third nonwoven fabric has a first region and a second region thinner than the first region,
the protrusion is located in the second region, and
the second region is disposed at a central region of the third nonwoven fabric when viewed in a direction perpendicular to a surface of the second nonwoven fabric facing the third nonwoven fabric and the first region is disposed at a region of the third nonwoven fabric other than the central region.

2. The laminated nonwoven fabric according to claim 1, wherein a height of the protrusion is more than a difference between a thickness of the first region and a thickness of the second region.

3. The laminated nonwoven fabric according to claim 1, wherein the average fiber diameter of the second fibers is equal to or less than 1 μm.

4. An air purifier comprising:
a sucker of a gas;
a discharger of the gas; and
the laminated nonwoven fabric according to claim 1 disposed between the sucker and the discharger.

5. A laminated nonwoven fabric comprising:
a first nonwoven fabric containing first fibers and second fibers;
a second nonwoven fabric laminated on the first nonwoven fabric and containing third fibers; and
an adhesive disposed between the first nonwoven fabric and the second nonwoven fabric,
wherein an average fiber diameter of the second fibers is equal to or less than 3 μm,
an average fiber diameter of the first fibers is equal to or larger than ten times of the average fiber diameter of the second fibers,
the first nonwoven fabric includes:
a base layer including a part of the first fibers; and
a composite layer disposed closer to the second nonwoven fabric than the base layer is, and including another part of the first fibers and the second fibers,
the second nonwoven fabric has a protrusion on a surface facing the first nonwoven fabric, the protrusion including a part of the third fibers entangled with each other,
at least a part of the adhesive is disposed between the protrusion and the first nonwoven fabric,
the second nonwoven fabric has a first region and a second region thinner than the first region,
the protrusion is located in the second region, and
the second region is disposed at a central region of the third nonwoven fabric when viewed in a direction perpendicular to a surface of the first nonwoven fabric facing the second nonwoven fabric and the first region is disposed at a region of the third nonwoven fabric other than the central region.

6. The laminated nonwoven fabric according to claim 5, wherein a height of the protrusion is more than a difference between a thickness of the first region and a thickness of the second region.

7. The laminated nonwoven fabric according to claim 5, wherein the average fiber diameter of the second fibers is equal to or less than 1μm.

8. An air purifier comprising:
a sucker of a gas;
a discharger of the gas; and
the laminated nonwoven fabric according to claim 5 disposed between the sucker and the discharger.

9. The laminated nonwoven fabric according to claim 2, wherein the height of the protrusion is 1 to 100 times of the difference between the thickness of the first region and the thickness of the second region.

10. The laminated nonwoven fabric according to claim 6, wherein the height of the protrusion is 1 to 100 times of the difference between the thickness of the first region and the thickness of the second region.

\* \* \* \* \*